United States Patent
Stenberg

(10) Patent No.: US 6,356,808 B1
(45) Date of Patent: Mar. 12, 2002

(54) METHOD FOR CELL ALIGNMENT AND IDENTIFICATION AND CALIBRATION OF ROBOT TOOL

(75) Inventor: Björn Stenberg, Askim (SE)

(73) Assignee: Robotkonsult AB, Askim (SE)

( * ) Notice: Subject to any disclaimer, the term of this patent is extended or adjusted under 35 U.S.C. 154(b) by 0 days.

(21) Appl. No.: 09/857,350
(22) PCT Filed: Dec. 17, 1999
(86) PCT No.: PCT/SE99/02400
§ 371 Date: Jun. 4, 2001
§ 102(e) Date: Jun. 4, 2001
(87) PCT Pub. No.: WO00/35639
PCT Pub. Date: Jun. 22, 2000

(30) Foreign Application Priority Data

Dec. 17, 1998 (SE) .............................................. 9804450

(51) Int. Cl.$^7$ .............................................. G05B 19/04
(52) U.S. Cl. .................. 700/254; 700/245; 700/246; 700/247; 700/248; 700/250; 700/251; 700/252; 700/253; 700/255; 700/256; 700/257; 700/258; 700/259; 700/260; 700/261; 700/262; 700/263; 700/264; 318/568.1; 318/568.12; 318/568.13; 318/568.16; 318/568.21; 318/568.22; 414/217; 414/227; 414/730; 414/941; 901/46; 901/47; 901/9; 73/1.75; 73/1.79
(58) Field of Search .................. 700/245–248, 700/250–264; 318/568.1, 568.12, 568.16, 568.21, 568.13, 568.22; 901/46, 47, 9; 414/217, 227, 730, 941; 73/1.79, 1.75

(56) References Cited

U.S. PATENT DOCUMENTS

| | | | |
|---|---|---|---|
| 4,831,549 A | * | 5/1989 | Red et al. ................... 700/245 |
| 4,972,347 A | | 11/1990 | Tarvin et al. |
| 5,396,160 A | * | 3/1995 | Chen ........................... 318/573 |
| 5,457,367 A | | 10/1995 | Thorne |
| 6,044,308 A | * | 3/2000 | Huissoon ..................... 700/166 |
| 6,205,839 B1 | * | 3/2001 | Brogardh et al. ............. 73/1.79 |
| 6,282,459 B1 | * | 8/2001 | Ballantine et al. .......... 700/245 |
| 6,321,137 B1 | * | 11/2001 | De smet ..................... 700/245 |

FOREIGN PATENT DOCUMENTS

| | | |
|---|---|---|
| JP | 6274213 A | 4/2000 |
| SE | 508161 C2 | 9/1998 |

OTHER PUBLICATIONS

Berthouset et al., Calibration of a foveated wide–angle lens on an active vision head, 1996, IEEE, pp. 183–188.*
Zhuang et al., Techical correspondence, 1996, IEEE, pp. 918–921.*

* cited by examiner

Primary Examiner—William A. Cuchlinski, Jr.
Assistant Examiner—McDieunel Marc
(74) Attorney, Agent, or Firm—Burns, Doane, Swecker & Mathis, L.L.P.

(57) ABSTRACT

A method for cell alignment, identification and calibration of part of a robot tool, preferably a part of the robot tool, is positioned close to a detector, whereupon it is moved repeatedly past the limit of the area of detection of the detector. During the movement, the pose of the robot is registered each time the surface of said robot tool comes into tangential contact with the area of detection, and an over determined system of equations is formed, consisting of a correlation between the registered poses and unknown parameters regarding the detection area of the detector and the location of the robot part in space. An error vector is introduced into the system of equations, which is then solved while minimizing the error vector, preferably in the least square sense, in order to thus identify said unknown parameters and the error vector.

20 Claims, 1 Drawing Sheet

METHOD FOR CELL ALIGNMENT AND IDENTIFICATION AND CALIBRATION OF ROBOT TOOL

TECHNICAL FIELD

The invention concerns a method of cell alignment and identification and calibration of robot tools. More particularly, the object of the invention is to determine and calibrate the operating point of a tool and the location of the robot relative to the work pieces for the purpose of ensuring the ability of the installed application to exactly repeat programmed paths of travel over long periods without re-programming being needed.

TECHNICAL BACKGROUND

The state of the art is described in U.S Pat. No. 5 457 367. Methods of the kind defined in this patent specification have been used successfully for many years and have satisfied the most basic needs in a highly excellent manner.

However, the degree of absolute accuracy has proved insufficient to meet strict demands for accuracy in connection with simulation of geometry and off-line programming of robots or manipulators. Furthermore, it has been found that various types of defects, such as play that may arise in a tool or a robot axle, or friction in an axle, affect the method in a manner that may cause undetectable erroneous calibration. As a result, it may be necessary to update the program of movement of the robot by manually adjusting all programmed points. Not only is this a time-consuming task but in addition it results in the robot program being updated with erroneous calibration data. The consequence is loss of control of stop times in case of future incidents. Also, one has found that minor but commonly occurring non-ideal situations may give rise to poor calibration repeatability.

Another technique is shown in SE 508 161, according to which a spherical calibration tool is mounted on a robot and is moved several times past a calibration beam. By repeating the process a large number of times, using different robot configurations, calibration of the robot is made possible.

This method is, however, time-consuming and expensive because of the special spherical calibration tool used, which must be applied to the robot at each and every instance of calibration. In addition, a large number of cycles are required to calibrate a robot (for example 38 cycles in the case of a robot having six degrees of freedom). Furthermore, calibration of the kind described in SE 508 161 is not particularly useful in connection with a robot located in a work environment but this prior-art method is more particularly concerned with pre-calibration of a robot before installation thereof in the workplace. In addition, knowledge of the entire robot's kinematic model is essential.

Two needs particularly are not met by the above method, viz.:

Cell calibration for the purpose of determining the position of the robot relative to the program of movement/workpiece with respect to which the robot movements are to be executed (so called cell alignment).

Identification and calibration of a robot tool. Both needs must be met to ensure the application-related function of a robot.

SUMMARY OF THE INVENTION

The object of the invention is to satisfy the need for a method of cell alignment and identification and calibration of robot tools that is sturdy, permanently installed, and absolutely accurate, that may be repeated with precision, and is automatic, quick, and inexpensive, in order to ensure that the robot is capable of repeating with precision programmed paths of movement over long periods of time while being governed by the originally programmed points or paths. In some cases, calibration is not possible, and then the identification may be used to automatically transform all programmed points in a manner corresponding to the change of the detected parameters.

This object of the invention is achieved by means of a method defined in the appended claims.

The method according to the invention offers considerable advantages. It is a high-technological and mathematically advanced method, which is applicable in the field, which directly operates on the objects of the application, and which optimizes the accuracy that is useful to the user.

It is not dependant on any particular calibration tool, but commonplace tools, such as welding electrodes or existing reference objects on gripping devices, work well to achieve the task.

The entire chain of precision of the application, including the position of the robot, the accuracy of the robot and the dimensions of the tool, is checked and/or is calibrated by analysis, resulting in information to the user of the accuracy available to him in the application executed by the robot. The method provides the user with a degree of accuracy that is optimized in one and the same operation and in terms of accuracy of use in the application in question. This method may give the application a higher degree of accuracy than the use of an individually calibrated robot comprising a separately and carefully measured tool and involving precisionmeasurement of the location of the robot relative to the workpiece, since this involves three separately suboptimized calibrations.

In addition, the method is applicable without knowledge of the kinematic model (equations) of the robot in question being necessary, a feature which broadens the practical applicability and the industrial usefulness, both because of the lesser requirements on separate adaptation to individual systems and because the kinematic models are difficult to access and in addition tend to become increasingly complex as the requirements from the market on absolute accuracy are becoming stricter (for which reason producing them is becoming increasingly time consuming unless one is in possession of special knowledge of the robot system in question).

BRIEF DESCRIPTION OF THE DRAWING FIGURES

The invention will be described in closer detail in the following, with reference to the accompanying drawings illustrating some preferred embodiments of the invention for exemplifying purposes. In the drawings.

DESCRIPTION OF A PREFERRED EMBODIMENT

Figure 1:
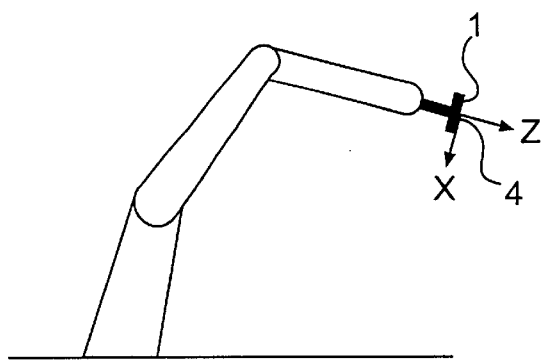
FIG. 1 shows a robot or manipulator, to which the method in accordance with the invention is applicable.
Figure 2:
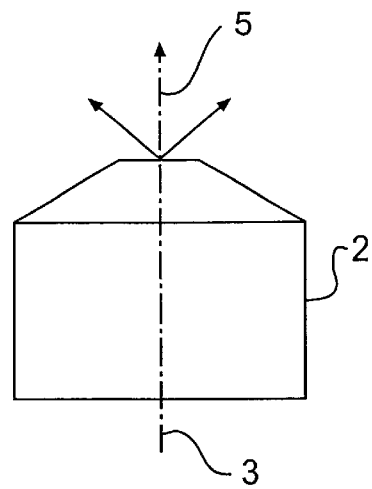
FIG. 2 is a cylindrical part of a robot.
Figure 3:
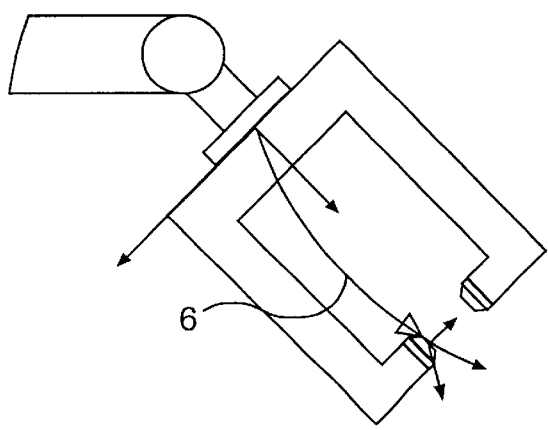
FIG. 3 illustrates a robot-mounted spot-welding gun.

Initially, the invention will be described by means of one practical example in its special application in an industrial robot or manipulator applied for spot-welding by means of a robot-mounted gun having an essentially cylindrical welding electrode.

A spot-welding robot comprising a spot-welding gun normally comprises two welding electrodes, of which one is essentially stationary and the other mobile. In the present case, the stationary electrode 2 is of standard type and essentially cylindrical in shape, the cylinder axis being referenced by numeral 3. The purpose of calibrating the operating point of the tool is to determine the location of an operating position 5, which is unambiguously defined by the electrode geometry relative to the robot-hand coordinate system 4, which is unambiguously defined by the tool fastening plate 1 of the robot, when the gun is open and fixed equalizing achieved. Different users have different wishes in this respect, but the invention may be adapted accordingly. The tool transform 6 is to be set to six degrees of freedom.

Conventionally, real guns are formed with a known nominal tool transform and are sufficiently precise as regards the rotary part of the tool transform, while the translation part needs to be calibrated at regular intervals. The sought-after translation is assumed to be within 10 mm from the nominal value, since in practical installations deviations above that value normally require re-direction. These are restrictions of a practical nature, but do not impose limitations on the invention.

A line detector, such as a reading fork of preferably light-beam type, is installed within the operating range of the robot. Neither the position nor the direction of the beam needs to be known. It should be possible to detect the interruption of the beam. Such a detection is an indication that the surface of the electrode is tangential to the detector line. An automatic method allowing determination with sufficient accuracy of the nominal direction of the detector line in space will be described below. Once this is known, it is possible to start the calibration.

Figure 4:
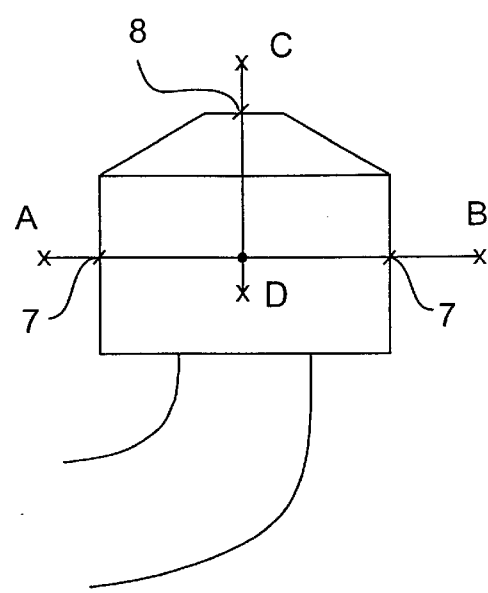
FIG. 4 illustrates the stationary electrode of the spot-welding gun.

Initially, the robot is positioned to ensure that the electrode is located on or close to the detector line, the cylinder axis extending essentially at right angles to the detector line. The robot then moves the electrode past the detector line such that the cylinder interrupts the beam. Every instance of detection by the detector line that the surface of the electrode assumes a position wherein it is tangential to the detector line, results in registration of the position assumed by the robot at that moment. The pattern of robot movements could be effected for instance as shown in FIG. 4 illustrating the movements of the detector line relative to the electrode in a plane at right angles to the detector line, which thus is a point in this plane. The robot moves the electrode backwards and forwards, from A to B and back to A. Following checks and calculations, the electrode is positioned such that the line detector extends along the cylinder axis, and the robot moves the electrode backwards and forwards, ensuring that the detector line moves backwards and forwards between C and D. Following further calculations, the movement between A and B is repeated, this time at a known distance from the surface of contact of the electrode. The data from the tangential contacts 7, 8 are stored. The registration/ storing can be made and stored respectively in the form of robot axes data or in the form of Cartesian coordinates, or both. A Cartesian registration could relate to the position of the tool attachment plate of the robot or to any other known tool transform.

The robot then rotates the tool about the cylinder axis over a number of degrees and the same pattern of movement is repeated. The procedure is repeated in the same manner following rotation over a number of degrees about the detector line.

In order to allows determination of the operating point of the electrode, the pattern of movement need to be repeated in all for at least three different angular positions, viz., one starting position and two rotations. The two rotations must not be executed about the same axis. Theoretically, this minimum registration suffices, but the possibility of obtaining a sturdy application offering satisfactory accuracy in practical terms increases when the angle between the two angular positions is increased as also when the angle between the axes of rotation is larger.

It is not necessary in order to practice the invention in its most restricted version, but most advantageous, to reiterate the registration process using a large number of angular positions. The volume of collected information data becomes larger and makes it possible to solve many problems of a practical nature. By small-step rotational movements and reiteration of the registration of the tangential contacts with the cylinder a large number of registrations may be effected without this being significantly more time consuming than are registrations at the end positions of the rotational movements. The strategies of how to vary these registrations may be varied infinitely for adaptation to special circumstances. The principle is to register positions, wherein, in the present case, the jacket face or end face of the cylinder becomes tangential to the detector line.

When the entire registration process is completed, the calculation process is started, which in this case is based only on the assumption that at the instance of each discrete registration the surface of the electrode is located in an arbitrary point along an unknown but static detector line. Furthermore, it is known which registrations are jacket-face registrations and which are endsurface registrations. The equation describing tangential contact between the jacket face and the detector line and tangential contact between the end face and the detector line, respectively, is defined. These equations comprise the unknown parameters determining the positions of the detector line and of the electrode, respectively, in the coordinate system of the robot hand Thus for each discrete instance of detection a relation in six degrees of freedom is obtained, comprising the eight unknown parameters. The minimum-data registration makes available nine stored positions determined in six degrees of freedom, i.e. 54 numbers. The result is an extensive and very excessively over determined system of equations, which may be used to satisfy a multitude of different end-user needs.

The basic need is to make it possible to automatically determine whether the calibration is satisfactory, i.e. whether the tool calibration provides a relevant and reliable result. To achieve this an error vector is introduced into the two fundamental equations, whereupon the system is solved on condition that the error vectors are minimized in some sense, preferably in the least square sense.

By establishing fixed criteria with respect size and distribution of the error vectors, it becomes possible to automatically confirm that the calibration operation has provided a result that is acceptable for the spot-welding application or whether an alarm should be given. Commonly occurring errors are play arising in the gun or friction arising in a robot joint, erroneous zero-position adjustment of the robot axis or deformed machine parts in the robot chain of precision or some other defect therein resuiting from breakdown or wear. In existent technology equipment, these situations produce the problems described earlier. Thanks to automatic analysis of the error vectors, it becomes possible to relate the error to various probable causes of error.

By extending the above equations to include also the kinematics of the robot, it becomes possible to introduce for example the zero points of axes 4 and 5 as parameters. If the actual error depends on a permanent shift of the zero point in axis 4 or 5, this will show in the minimization of the error vector, and calibration thereof in accordance with the identification will allow the operating program of the robot to continue to be used without requiring manual program adjustment. In a similar manner, the occurrence of play in the pivot center of the gun could be defined in the equations, and an alarm be made to indicate the likely fault. The method could likewise be applied more extensively, to identify a larger number of the robot parameters for the purpose of achieving absolute accuracy.

There is a considerable interest for a method enabling post-calibration of robots already installed at the customer workplace, both as regards subsets of parameters that need to be calibrated in situ and complete calibrations.

At the initial installation of the robot, the detector line is arranged in the desired location within the operational range of the robot and the robot is jogged manually in position until the electrode is located on or close to the detector line, with the cylinder axis extending essentially at right angles to the detector line. The installation program is then started, and by means of pure translatory movements it registers several points of tangential contact along the detector line, with the jacket face as well as with the end face. This arrangement allows the robot to calculate the orientation of the detector line in space with a high degree of accuracy. The cylinder axis is known already and remaining movements may be performed with these lines extending at right angles to one another. Also the orientation of the electrode in space may be determined in a similar manner, should this be preferable. In addition, no knowledge is required concerning nominal tool transforms, since minor rotational movements and simple calculations make it easy to detect the approximate position of the electrode or the detector line and to successively tune the determination process until a larger number of rotations may be performed without risk of collisions.

Generalizations of the Invention
Various Methods of Detection

The invention can be practiced using other detector means than light beams. Any line detector able to be described mathematically could be used, such as e.g. a thread the downward pending part of which can be configured correctly. Also position detectors that lend them-selves to configuration by points or possessing more complex properties, such as hysteresis, may be used, as also surface sensors, such as a light curtain, laser scanners or contact-sensitive surfaces, such as sheet metal.

The invention provides a novel detector/sensor, which allows detection/sensing with the aid of contact with a free liquid surface. A characteristic advantage of using a liquid surface is the perpendicularity of the latter to the direction of gravity, a feature that is very useful for cell calibration.

Existing inexpensive line detectors offer no information regarding the along-the-line positions. This is the reason for the devise of the novel detector. The latter is a calibration detector using two or several adjacent but non-parallel lines, which may be detected separately or sequentially. The angle between the lines need not be known. The spacing between the detection points on the different lines provides a direct relative measure as to where along the detector line that the detection has occurred. Upon completion of a calculation operation, a mathematical expression of both or all lines, and consequently individual registrations, may be solved, also with regard to where along the line that detection has taken place.

Calibration of the Rotation of the Tool Transform

In cases where calibration of the tool transform is necessary, the invention may be used in same manner, but suitable points need to be registered. In the case of spot welding, more points are registered along the cylinder surface and the orientation of the cylinder axis can be identified. The spacing between the points must be sufficient to meet the demands of final accuracy.

Different Tool Geometry Configurations Adjacent the Operating Point

Essentially cylindrical tool parts like spot welding electrodes, are suitable objects but the invention is not restricted to shapes of this kind. Every body that may be expressed in mathematical terms by a restricted number of parameters may be used. The principle is the same. The invention is applicable also to square or angled bodies, such as parallepipedon shapes. In some cases, for instance as regards grippers; it could be an advantage to introduce at suitable locations one or several, preferably cylindrical objects, that are able to unambiguously define the tool transform of the gripper. Normally, grippers need to be calibrated with respect to the entire tool transform, for which reason the use of three objects is recommended.

Different Forms of Registration

For registration of points of tangential contact different forms of registration are possible. A Cartesian coordinate registration may concern the tool attachment plate of the robot, or any other known tool transform.

The tool transform may even be arbitrary, nonrepeatable and non-predictable, as long as it is known at the instance of registration and is stored in association therewith. Preferably, the registration and storing processes yield sufficient data to provide an unambiguous specification of the location in space of the tool in six degrees of freedom (such as xyzabc or the axis positions theta1, theta2, , theta6). This is not, however, necessary. Should for instance only xyzabc available the mathematics could be adapted accordingly. It is even possible to adapt the method to one-dimensional registrations, which, however, increases the risk that unsolvable problems in the form of mathematical singularities, and others, are encountered in some installations.

Different Axis Configurations

The accuracy may be increased considerably if the robot is allowed to repeat part of or the entire procedure of detection using different axis configurations. For instance, axes 4 and 5 could be located in a mirrorfashion (inverted sign in the axes space) while the main axes essentially are in the same position as in the starting position, and axes 6 may be adjusted such that the tool again assumes the same position as in the starting position. Or axes 1 can be placed at 180 degrees and axes 2–3 above the head ("uber Kopf").

In this manner additional information data are gathered, which to some extent differ as to their nature from the previous ones, since these data are particularly powerful for zero-position calibration, for example in axes 4 and 5. In this case, the registration process must not involve different rotational movements in the line of detection. In this case, and with a high degree of accuracy, the robot can be calibrated with respect to the zero position in axes 4 and S. Also the zero position in axis 6 may be calibrated, but this situation cannot be distinguished from a rotational movement of the tool transform. However, the desired end result, i.e. that the existing robot program be useful after the calibration, is achieved.

Spatially Fixed Tool

In applications, where the tool is fixed in space, the detector is mounted on the robot, and the method is performed in analogy with the above.

Cell Calibration

Automatic cell calibration may be performed by arranging for one or several detector lines to be located in a known precise position relative to the work task to be performed by the robot. Complete cell calibration may be effected with the aid of two lines, in which case the robot and its tools are adapted to the cell in question. A vertical line and a liquid surface at a known level also provide complete calibration. Other detectors may be used in a corresponding manner.

When setting a robot line, which today usually is done with the aid of e.g. theodolites, it may be particularly advantageous to provide two or more detector lines as installation references. These detector lines may then be used by a robot that is calibrated in accordance with the teachings of the invention, in order to thus considerably facilitate the putting into service of an offlineprogrammed robot in a line.

SUMMARY

Although preferred embodiments of the present invention have been described above, it should be obvious to the average expert in the field that several modifications and alterations of the present invention may be made without departure from the idea or scope of protection of the invention. Consequently, the only restriction of the scope of the present invention should be regarded to be that imposed by the appended claims.

What is claimed is:

1. A method of cell alignment and identification and calibration of a robot tool, comprising the steps of:

locating a robot part, preferably a part of the robot tool, to a position close to a detector assuming a known position relative to the task of the robot, moving said robot part repeatedly past the limit of the area of detection of the detector, during said robot movement, registering the pose of the robot, wherein said pose is a mechanical location as discerned by an control system, each time the surface of said robot tool comes into tangential contact with the area of detection, forming an over determined system of equations consisting of a correlation between the registered poses and unknown parameters regarding the detection area of the detector and the location of the robot part in space, said unknown parameters comprising parameters that determine the position of installation of the robot relative to its task, introducing an error vector into the system of equations, and solving said system of equations while minimizing the error vector, preferably in the least square sense, in order to thus identify said unknown parameters and the error vector.

2. The method as claimed in claim 1, wherein said unknown parameters comprise parameters determining an operating point of the tool.

3. The method as claimed in claim 2, wherein said unknown parameters comprise an zero point of at least one of the robot axes, whereby upon solution of the system of equations any shift of said zero point is identified.

4. The method as claimed in claim 3, wherein the robot pose is registered with respect to at least two different rotations.

5. The method as claimed in claim 2, wherein the robot pose is registered with respect to at least two different rotations.

6. The method as claimed in claim 2, wherein said robot part is essentially cylindrical.

7. The method as claimed in claim 2, wherein said detector comprises a line detector the area of detection of which is a straight line.

8. The method as claimed in claim 1, wherein said unknown parameters comprise an zero point of at least one of the robot axes, whereby upon solution of the system of equations any shift of said zero point is identified.

9. The method as claimed in claim 8, wherein the robot pose is registered with respect to at least two different rotations.

10. The method as claimed in claim 1, wherein the robot pose is registered with respect to at least two different rotations.

11. The method as claimed in claim 10, wherein upon each rotation, the robot part is moved past the limit of the area of detection of the detector along a first rectilinear line (A-B), thereafter past the limit of the area of detection of the detector along a second rectilinear line (C-D), which is essentially perpendicular to the first line, and finally again past the limit of the area of detection of the detector along said first rectilinear line (A-B).

12. The method as claimed in claim 1, wherein said robot part is essentially cylindrical.

13. The method as claimed in claim 1, wherein said detector comprises a line detector the area of detection of which is a straight line.

14. The method as claimed in claim 13, wherein the detector comprises several line detectors enabling registration of a larger amount of different poses.

15. The method as claimed in claim 1, wherein the detector comprises a surface detector.

16. The method as claimed in claim 15, wherein the surface detector is the surface of a liquid.

17. The method as claimed in claim 1, wherein the steps of repeatedly moving said robot part beyond the area of detection of the detector, and of registering the position of the robot each time the surface of the robot part makes tangential contact with the area of detection are repeated for at least two different axis-configurations, for example with two robot axes located mirror-inverted.

18. The use of the method as claimed in claim 1 for cell calibration of a robot, the detector assuming a known position relative to the task of the robot.

19. The use of the method as claimed in claim 1 to identify errors and lack of accuracy play, in the robot.

20. The use of the method as claimed in claim 1 to identify one of several robot parameters in connection with post-calibration in field.

* * * * *